United States Patent
Fujioka et al.

(10) Patent No.: US 9,662,759 B2
(45) Date of Patent: May 30, 2017

(54) GRINDING METHOD OF HONEYCOMB STRUCTURE

(71) Applicant: NGK INSULATORS, LTD., Nagoya (JP)

(72) Inventors: Yasumasa Fujioka, Nagoya (JP); Masanari Iwade, Nagoya (JP); Akifumi Nishio, Nagoya (JP); Taishi Michiwaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 375 days.

(21) Appl. No.: 14/029,851

(22) Filed: Sep. 18, 2013

(65) Prior Publication Data
US 2014/0087636 A1 Mar. 27, 2014

(30) Foreign Application Priority Data
Sep. 25, 2012 (JP) .................................. 2012-211514

(51) Int. Cl.
*B24B 5/50* (2006.01)
*B24B 5/16* (2006.01)
(Continued)

(52) U.S. Cl.
CPC ............ *B24B 5/50* (2013.01); *B01D 46/2451* (2013.01); *B24B 1/00* (2013.01); *B24B 5/04* (2013.01);
(Continued)

(58) Field of Classification Search
CPC .... B24B 1/00; B24B 5/04; B24B 5/14; B24B 5/50; B24B 5/16; B24B 5/42; B24B 5/26;
(Continued)

(56) References Cited

U.S. PATENT DOCUMENTS 1,332,437 A * 3/1920 Ely .......................... B23Q 1/00
                                                       451/211
1,440,338 A * 12/1922 Buswell .................. B24B 53/07
                                                       125/11.03
(Continued)

FOREIGN PATENT DOCUMENTS

JP       60-232857 A1    11/1985
JP       08-099257 A1     4/1996
(Continued)

OTHER PUBLICATIONS

Extended European Search Report (Application No. 13185512.4) dated Nov. 4, 2016.
(Continued)

*Primary Examiner* — Joseph J Hail
*Assistant Examiner* — Arman Milanian
(74) *Attorney, Agent, or Firm* — Burr & Brown, PLLC

(57) ABSTRACT

There is disclosed a grinding method of a honeycomb structure, wherein a grind processing member having an outer peripheral surface, a first grinding wheel tapered surface and a second grinding wheel tapered surface and rotating around a central axis grinds a joined honeycomb segment assembly rotating around a central axis, and the above respective surfaces of the grind processing member form a first ground region, a second ground region, a center ground surface, a first tapered surface and a second tapered surface, to prepare the honeycomb structure including a cylindrical honeycomb base material, and a ring-like bulge portion "which surrounds an outer periphery of the honeycomb base material, protrudes from the outer periphery of the honeycomb base material toward the outside in a flange manner, and has the first tapered surface, the second tapered surface and the center ground surface."

9 Claims, 8 Drawing Sheets

(51) Int. Cl.
- *B24B 5/04* (2006.01)
- *B24B 1/00* (2006.01)
- *B24B 5/14* (2006.01)
- *B01D 46/24* (2006.01)
- *B24B 5/26* (2006.01)
- *B24B 5/42* (2006.01)

(52) U.S. Cl.
CPC ........ *B24B 5/14* (2013.01); *B24B 5/16* (2013.01); *B24B 5/26* (2013.01); *B24B 5/42* (2013.01)

(58) Field of Classification Search
CPC .......... B01J 35/04; B23Q 35/04; B23Q 35/08; B23Q 35/102; B23Q 15/00; B23Q 15/22; B23Q 2735/025
USPC ................................................. 83/58; 451/49
See application file for complete search history.

(56) References Cited

U.S. PATENT DOCUMENTS

| | | | | |
|---|---|---|---|---|
| 1,737,707 | A * | 12/1929 | Dickson | B24B 27/027 43/23 |
| 1,941,598 | A * | 1/1934 | Cleveland | B24B 27/00 451/123 |
| 2,016,590 | A * | 10/1935 | Bussing | B24B 1/00 451/142 |
| 2,257,619 | A * | 9/1941 | Prill | B24B 5/363 451/295 |
| 2,502,922 | A * | 4/1950 | Bura | B23B 27/06 125/11.17 |
| 2,676,507 | A * | 4/1954 | Le Brusque | B23Q 35/08 409/127 |
| 3,120,725 | A * | 2/1964 | Milewski | B23B 23/005 451/398 |
| 3,142,214 | A * | 7/1964 | Allen | B23Q 15/00 188/136 |
| 3,174,404 | A * | 3/1965 | Findley | B23B 1/00 82/11.1 |
| 3,447,419 | A * | 6/1969 | Foster | B23Q 15/22 318/572 |
| 4,474,721 | A * | 10/1984 | Carpenter | B23B 1/00 264/157 |
| 4,709,508 | A | 12/1987 | Junker | |
| 5,487,694 | A * | 1/1996 | Deming | B24B 9/02 409/132 |
| 5,954,567 | A * | 9/1999 | Nishio | B24B 5/01 451/41 |
| 6,220,940 | B1 * | 4/2001 | Johnson | B24B 5/18 451/168 |
| 6,919,052 | B2 * | 7/2005 | Foster | B01J 8/0438 422/177 |
| 7,309,277 | B2 * | 12/2007 | Nishio | B23D 57/0007 451/51 |
| 7,452,263 | B2 * | 11/2008 | Itoh | B24B 5/04 451/11 |
| 2002/0086614 | A1 * | 7/2002 | Eichelberger | B01D 53/885 451/8 |
| 2004/0255736 | A1 * | 12/2004 | Nakamura | B23Q 1/015 82/149 |
| 2006/0062592 | A1 * | 3/2006 | Taguchi | G03G 5/10 399/111 |
| 2006/0289501 | A1 * | 12/2006 | Michiwaki | B24B 9/06 219/687 |
| 2007/0082584 | A1 | 4/2007 | Itoh | |
| 2008/0176029 | A1 * | 7/2008 | Ichikawa | B01D 46/2455 428/117 |
| 2009/0075565 | A1 * | 3/2009 | Jaeger | B23B 1/00 451/28 |
| 2011/0045739 | A1 * | 2/2011 | Keijzer | B24B 5/37 451/5 |
| 2011/0126973 | A1 * | 6/2011 | Andrewlavage, Jr. | B28B 19/0038 156/247 |
| 2014/0087080 | A1 * | 3/2014 | Fujioka | B05D 1/42 427/355 |
| 2014/0123612 | A1 * | 5/2014 | Yamada | B01D 46/2459 55/523 |
| 2014/0363616 | A1 * | 12/2014 | Aoyama | B01D 53/74 428/116 |
| 2015/0290591 | A1 * | 10/2015 | Saukaitis | B01D 67/0069 427/245 |

FOREIGN PATENT DOCUMENTS

| | | | | |
|---|---|---|---|---|
| JP | 3432061 | B2 * | 6/1997 | ............ B01D 46/00 |
| JP | 10-156684 | A1 | 6/1998 | |
| JP | 2001314718 | A * | 11/2001 | ............ B01D 39/00 |
| JP | 2002-137153 | A1 | 5/2002 | |
| JP | 2005-125182 | A1 | 5/2005 | |
| JP | 2005125182 | A * | 5/2005 | ............ B01D 39/00 |
| JP | 2007-011846 | A1 | 1/2007 | |
| JP | 2010184218 | A * | 3/2010 | ............ B01D 53/86 |
| WO | 2005/049270 | A1 | 6/2005 | |

OTHER PUBLICATIONS

Japanese Office Action (Application No. 2012-211514) dated Sep. 16, 2014.

* cited by examiner

GRINDING METHOD OF HONEYCOMB STRUCTURE

The present application is an application based on JP-2012-211514 filed on Sep. 25, 2012 with the Japanese Patent Office, the entire contents of which are incorporated herein by reference.

BACKGROUND OF THE INVENTION

Field of the Invention

The present invention relates to a grinding method of a honeycomb structure, and more particularly, it relates to a grinding method of a honeycomb structure which can enhance a contour accuracy of a processed surface and form "a honeycomb structure having a ring-like bulge portion on an outer periphery, the bulge portion being formed into a tapered shape" in a short time.

Background Art

Heretofore, a honeycomb structure made of a ceramic material has been used as a diesel particulate filter (DPF) or a catalyst loading body for use in an exhaust system of an exhaust gas. Such a honeycomb structure made of the ceramic material is prepared, for example, by grinding an outer periphery of a joined honeycomb segment assembly to form the assembly into a columnar shape (e.g., see Patent Document 1). Here, in the present description, "the joined honeycomb segment assembly" is formed by joining a plurality of "honeycomb segments made of the ceramic material (the ceramic honeycomb segments)". Therefore, the assembly is in a state prior to grinding the outer periphery, and does not have a final shape. Moreover, "the honeycomb structure" has the final shape obtained by grinding the outer periphery of the joined honeycomb segment assembly.

The grinding method disclosed in Patent Document 1 is, for example, a method of grinding the outer periphery of a ceramic work (e.g., the joined honeycomb segment assembly) into a predetermined shape by a grinding wheel, while rotating the work. Further specifically, in the grinding method disclosed in Patent Document 1, plunge grinding to grind the work by plunging the grinding wheel in a direction intersecting with a rotational axis of the work is performed on a predetermined portion of the work in a length direction. Afterward, traverse grinding to grind the work by moving the grinding wheel relatively along a direction parallel to the rotational axis of the work is performed toward the plunge grinding portion. According to such a constitution of the grinding method disclosed in Patent Document 1, a processing time can be shortened, and chipping can be prevented.

Moreover, a method is disclosed in which an outer periphery of a work is processed using a grinding wheel, while rotating the work (e.g., a workpiece or the like) (e.g., see Patent Documents 2 and 3).

[Patent Document 1] WO 2005/049270
[Patent Document 2] JP-A-S60-232857
[Patent Document 3] JP-A-H08-99257

SUMMARY OF THE INVENTION

A grinding method disclosed in Patent Document 1 is an excellent method as a method of preparing a columnar honeycomb structure. However, the grinding method has the problem that formation of a bulge portion takes time, and a manufacturing time lengthens, when "the honeycomb structure having a ring-like bulge portion on an outer periphery, the bulge portion being formed into a tapered shape" is prepared. Specifically, in the grinding method disclosed in Patent Document 1, when the tapered bulge portion is formed, it is necessary to move a grinding wheel at a low speed in a direction other than a central axis direction (a rotational axis direction) of the honeycomb structure. Therefore, a long time has been required for grind processing. A DPF having the above structure includes the ring-like bulge portion, and hence when the DPF is held in a metal container via a cushion material, the DPF can effectively be prevented from being moved in a diameter direction/a length direction in the metal container. This is especially effective when the DPF is heavy. Moreover, as one of required characteristics of the ring-like bulge portion, the ring-like bulge portion preferably has a sufficient strength, because the DPF is fixed by the ring-like bulge portion. Furthermore, the ring-like bulge portion is preferably integrated with the DPF. When the ring-like bulge portion has a poor strength or has cracks, the DPF is removed due to vibration, and cannot be held. A dimensional accuracy is also important for the ring-like bulge portion, so that an overload is not locally applied to the ring-like bulge portion.

Moreover, in a grinding method disclosed in Patent Document 2, when an outer periphery of a rotating work is ground by a grinding wheel, the work comes in contact with the grinding wheel only at a point. Therefore, when a honeycomb structure made of a ceramic material is processed by this method, there has been the problem that a contour accuracy of a processed surface (a ground surface) deteriorates. Furthermore, in the grinding method, when "the honeycomb structure having a ring-like bulge portion on the outer periphery, the bulge portion being formed into the tapered shape" is prepared, there has been the problem that the formation of the bulge portion takes time, and a manufacturing time lengthens.

Furthermore, in a grinding method disclosed in Patent Document 3, there is used a grinding wheel having a tapered portion for rough grinding in a travel direction of the grinding wheel, and a straight portion for finish grinding which is parallel to a rotational axis of a work. Moreover, when an outer periphery of the work is ground by the grinding wheel, the rough grinding is first performed by the tapered portion of the grinding wheel and then the finish grinding is performed by the straight portion of the grinding wheel. Therefore, the grinding wheel is provided with the tapered portion, but a tapered portion is not formed in the processed work by this tapered portion. Conversely, in this method, the straight portion for the finish grinding is parallel to the rotational axis of the work, and hence it is difficult to form the honeycomb structure having the ring-like bulge portion formed into the tapered shape. This is because the tapered portion of the ring-like bulge portion is not parallel to the central axis (the rotational axis) of the honeycomb structure, and hence when the straight section is used as it is, any tapered portions cannot be formed.

The present invention has been developed in view of the above problem. An object of the present invention is to provide a grinding method of a honeycomb structure which can enhance a contour accuracy of a processed surface, and form "the honeycomb structure having a ring-like bulge portion on an outer periphery, the bulge portion being formed into a tapered shape" in a short time.

To achieve the above-mentioned object, according to the present invention, a grinding method of a honeycomb structure is provided as follows.

[1] A grinding method of a honeycomb structure which subjects an outer peripheral portion of a joined honeycomb segment assembly to grind processing by use of a disc-like grind processing member. The grind processing member includes a disc-like disc portion and a ring-like grinding wheel portion disposed on an outer periphery of the disc portion. In a state where a central axis of the grind processing member is parallel to a central axis of the joined honeycomb segment assembly, the outer peripheral portion of the joined honeycomb segment assembly is ground by the grinding wheel portion of the grind processing member, while rotating the joined honeycomb segment assembly around the central axis and rotating the grind processing member around the central axis, to prepare the honeycomb structure including a columnar honeycomb base material and a ring-like bulge portion. The grinding wheel portion of the grind processing member has an outer peripheral surface formed in parallel with the central axis, a first grinding wheel tapered surface formed at one end in a central axis direction in such a tapered manner as to decrease an outer diameter of a tip, and a second grinding wheel tapered surface formed at the other end in the central axis direction in such a tapered manner as to decrease the outer diameter of the tip. The joined honeycomb segment assembly is an assembly to be ground which is formed by joining side surfaces of a plurality of ceramic honeycomb segments to one another. The grinding method of the honeycomb structure has a first ground region forming step where the grinding wheel portion of the grind processing member grinds a part of the outer peripheral portion of the joined honeycomb segment assembly having a first end as one end and a second end as the other end, on the side of the first end, to form a first ground region of the honeycomb base material and a first tapered portion of the ring-like bulge portion; a second ground region forming step where the grinding wheel portion of the grind processing member grinds a part of a non-ground region of the outer peripheral portion of the joined honeycomb segment assembly as a region which is not ground, on the side of the second end, to form a second ground region of the honeycomb base material and a second tapered portion of the ring-like bulge portion; and a center ground surface forming step where the grinding wheel portion of the grind processing member grinds a remaining non-ground region of the outer peripheral portion of the joined honeycomb segment assembly as a region which is left non-ground, to form a center ground surface of the ring-like bulge portion. In the first ground region forming step, the outer peripheral surface of the grinding wheel portion forms the first ground region, and the first grinding wheel tapered surface of the grinding wheel portion forms the first tapered portion which tapers toward the first end, between the non-ground region which is not ground on the second end side and the first ground region. In the second ground region forming step, the outer peripheral surface of the grinding wheel portion forms the second ground region, and the second grinding wheel tapered surface of the grinding wheel portion forms the second tapered portion which tapers toward the second end, between the remaining non-ground region which is left non-ground and the second ground region. The center ground surface formed in the center ground surface forming step is the surface which comes in contact with a first tapered surface which is the tapered surface of the first tapered portion and a second tapered surface which is the tapered surface of the second tapered portion. The honeycomb base material of the honeycomb structure is formed by joining the side surfaces of the plurality of ceramic honeycomb segments to one another. The ring-like bulge portion of the honeycomb structure surrounds an outer periphery of the honeycomb base material, protrudes from the outer periphery of the honeycomb base material toward the outside in a flange manner, and has the first tapered surface, the second tapered surface and the center ground surface.

[2] The grinding method of the honeycomb structure according to the above [1], wherein a grinding wheel width which is a length of the grinding wheel portion in the central axis direction is from 25 to 35 mm.

[3] The grinding method of the honeycomb structure according to the above [1] or [2], wherein an outer periphery width which is a length of the outer peripheral surface of the grinding wheel portion in the central axis direction is from 9 to 15 mm.

[4] The grinding method of the honeycomb structure according to any one of the above [1] to [3], wherein a length of each of one end surface and the other end surface of the grinding wheel portion in the central axis direction "in a diameter direction which is a direction from the central axis toward the outside" is from 3 to 7 mm.

A grinding method of a honeycomb structure of the present invention is a method of grinding an outer periphery of a joined honeycomb segment assembly by a grind processing member, in a state where a central axis of the grind processing member "having an outer peripheral surface, a first grinding wheel tapered surface and a second grinding wheel tapered surface" is parallel to a central axis of the joined honeycomb segment assembly. The grinding method of the honeycomb structure of the present invention has a first ground region forming step, a second ground region forming step and a center ground surface forming step as grind processing steps. Moreover, the first ground region forming step is a step where the outer peripheral surface and the first grinding wheel tapered surface of the grind processing member form a first ground region and a first tapered portion. Furthermore, the second ground region forming step is a step where the outer peripheral surface and the second grinding wheel tapered surface of the grind processing member form a second ground region and a second tapered portion. Additionally, the center ground surface forming step is a step where the outer peripheral surface of the grind processing member forms a center ground surface.

Consequently, in the grinding method of the honeycomb structure of the present invention, the first grinding wheel tapered surface of the grind processing member forms the first tapered portion of "a complementary shape to the first grinding wheel tapered surface". That is, the shape of the first tapered portion is "the shape to which a shape of the first grinding wheel tapered surface has been transferred". Therefore, a contour accuracy of the surface of the first tapered portion (the contour accuracy of the processed surface) can be enhanced. Furthermore, during the grinding by the grind processing member, the grind processing member is preferably moved in parallel with the central axis of the joined honeycomb segment assembly, in the state where the central axis of the grind processing member is parallel to the central axis of the joined honeycomb segment assembly. In consequence, the first tapered portion can be formed in a shorter time. Moreover, the second tapered portion is similarly formed by the second grinding wheel tapered surface. Therefore, the contour accuracy of the processed surface can be enhanced, and the processing can be performed in a short time. Furthermore, the first ground region, the second ground region and the center ground surface are formed by the outer peripheral surface of the grind processing member, and hence the contour accuracy of the processed surface can be enhanced and the grind processing can be performed in a short time.

Additionally, in the grinding method of the honeycomb structure of the present invention, the first grinding wheel tapered surface of the grind processing member forms the first tapered portion, the second grinding wheel tapered surface forms the second tapered portion, and the outer peripheral surface forms the first ground region, the second ground region and the center ground surface. Consequently, in the grinding method of the honeycomb structure of the present invention, the respective "surfaces" of the one grind processing member form the respective surfaces of the obtained honeycomb structure. Therefore, in the grinding method of the honeycomb structure of the present invention, the joined honeycomb segment assembly is ground only by use of the one grind processing member, so that the desirable honeycomb structure can be obtained. Moreover, the respective "surfaces" of the grind processing member grind the joined honeycomb segment assembly, and hence "the surfaces" (the first tapered surface and the like) of the joined honeycomb segment assembly (the honeycomb structure) formed by the grinding become "the surfaces" having a suitable contour accuracy.

DETAILED DESCRIPTION OF THE INVENTION

Figure 1:
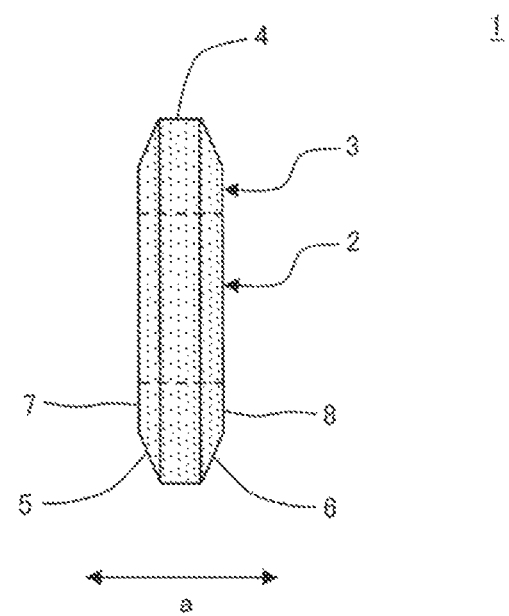
FIG. 1 is a front view schematically showing a grind processing member for use in an embodiment of a grinding method of a honeycomb structure of the present invention.

Embodiments of the present invention will specifically be described with reference to the drawings. The present invention is not limited to the following embodiments, and changes, modifications and improvements can be added without departing from the gist of the present invention.

As shown in FIG. 1 to FIG. 8, a grinding method of a honeycomb structure of the present embodiment is as follows. That is, the grinding method of the honeycomb structure of the present embodiment is a method of subjecting an outer peripheral portion of a joined honeycomb segment assembly 11 to grind processing by use of a disc-like grind processing member 1.

Further specifically, in the grinding method of the honeycomb structure of the present embodiment, the grind processing member 1 includes a disc-like disc portion 2 and a ring-like grinding wheel portion 3 disposed on an outer periphery of the disc portion 2. In a state where a central axis of the grind processing member 1 is parallel to a central axis of the joined honeycomb segment assembly 11, the joined honeycomb segment assembly 11 is rotated around the central axis, and the grind processing member 1 is rotated around the central axis. Moreover, during the above rotation, the outer peripheral portion of the joined honeycomb segment assembly 11 is ground by the grinding wheel portion 3 of the grind processing member 1, to prepare a honeycomb structure 41 including a columnar honeycomb base material 42 and a ring-like bulge portion 43. The grinding wheel portion 3 of the grind processing member 1 has an outer peripheral surface 4, a first grinding wheel tapered surface 5, and a second grinding wheel tapered surface 6. The outer peripheral surface 4 is the surface formed in parallel with the central axis. The first grinding wheel tapered surface 5 is the surface formed at one end in a central axis direction in such a tapered manner as to decrease an outer diameter of a tip. Moreover, the second grinding wheel tapered surface 6 is the surface formed at the other end in the central axis direction in such a tapered manner as to decrease the outer diameter of the tip. The joined honeycomb segment assembly 11 is an assembly to be ground which is formed by joining side surfaces 13 of a plurality of ceramic honeycomb segments 12 to one another.

The grinding method of the honeycomb structure of the present embodiment has a first ground region forming step, a second ground region forming step and a center ground surface forming step. It is to be noted that "a joined honeycomb segment assembly which is being ground" will also be referred to as "the joined honeycomb segment assembly". Moreover, what is obtained after ending all the grinding steps (the first ground region forming step, the second ground region forming step and the center ground surface forming step) will be referred to as "the honeycomb structure".

The first ground region forming step is a step where the grinding wheel portion 3 of the grind processing member 1 grinds a part of the outer peripheral portion of the joined honeycomb segment assembly 11 having a first end 14 as one end and a second end 15 as the other end, on the side of the first end 14. Moreover, in the first ground region forming step, the above grinding is performed to form a first ground region 21 of the honeycomb base material 42 and a first tapered portion 22 of the ring-like bulge portion 43. The second ground region forming step is a step where the grinding wheel portion 3 of the grind processing member 1 grinds a part of a non-ground region 25 of the outer peripheral portion of the joined honeycomb segment assembly 11 as the region which is not ground, on the side of the second end 15. Then, the above grinding is performed to form a second ground region 23 of the honeycomb base material 42 and a second tapered portion 24 of the ring-like bulge portion 43 in the step. The center ground surface forming step is a step where the grinding wheel portion 3 of the grind processing member 1 grinds a remaining non-ground region 26 as "the region of the outer peripheral portion" of the joined honeycomb segment assembly 11 "which is left non-ground", to form a center ground surface 33 of the ring-like bulge portion 43.

Moreover, in the first ground region forming step, the outer peripheral surface 4 of the grinding wheel portion 3 forms the first ground region 21. Furthermore, the first grinding wheel tapered surface 5 of the grinding wheel portion 3 forms the first tapered portion 22 which tapers toward the first end 14, between "the non-ground region 25 as "the region which is not ground" on the second end 15 side" and "the first ground region 21". Then, in the second ground region forming step, the outer peripheral surface 4 of the grinding wheel portion 3 forms the second ground region 23. Furthermore, the second grinding wheel tapered surface 6 of the grinding wheel portion 3 forms the second tapered portion 24 which tapers toward the second end 15, between ""the remaining non-ground region 26" which is left non-ground" and "the second ground region 23". Then, the center ground surface 33 formed in the above center ground surface forming step is the surface which comes in contact with a first tapered surface 31 which is the tapered surface of the first tapered portion 22 and a second tapered surface 32 which is the tapered surface of the second tapered portion 24. It is to be noted that the first grinding wheel tapered surface 5 is "the surface formed at one end in a central axis direction a in such a tapered manner as to decrease the outer diameter of the tip" of the grinding wheel portion 3. Moreover, the second grinding wheel tapered surface 6 is "the surface formed at the other end in the central axis direction a in such a tapered manner as to decrease the outer diameter of the tip" of the grinding wheel portion 3. Here, in the grinding method of the honeycomb structure of the present embodiment, "the central axis of the grind processing member 1", "the central axis of the disc portion 2" and "the central axis of the grinding wheel portion" are common, and each axis preferably extends in "the central axis direction a".

As described above, when the first ground region 21 and the first tapered portion 22 are formed in the joined honeycomb segment assembly 11, the first ground region forming step ends. Moreover, when the second ground region 23 and the second tapered portion 24 are formed in the joined honeycomb segment assembly 11, the second ground region forming step ends. Furthermore, when the center ground surface 33 is formed in the joined honeycomb segment assembly 11 to obtain the honeycomb structure 41, the center ground surface forming step ends.

The honeycomb base material 42 of the honeycomb structure 41 is formed by joining the side surfaces 13 of the plurality of ceramic honeycomb segments 12 to one another. The ring-like bulge portion 43 of the honeycomb structure 41 surrounds an outer periphery of the honeycomb base material 42, protrudes from the outer periphery of the honeycomb base material 42 toward the outside in a flange manner, and has the first tapered surface 31, the second tapered surface 32 and the center ground surface 33.

Figure 2:
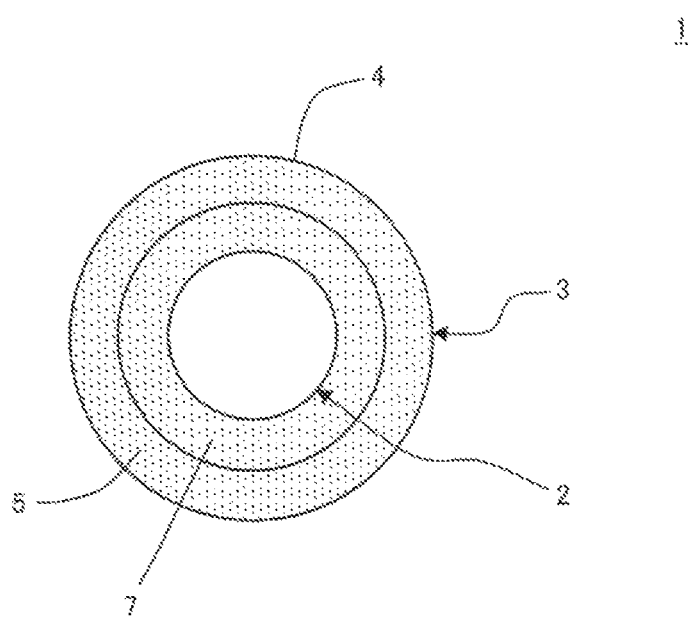
FIG. 2 is a side view schematically showing the grind processing member for use in the embodiment of the grinding method of the honeycomb structure of the present invention.
Figure 3:
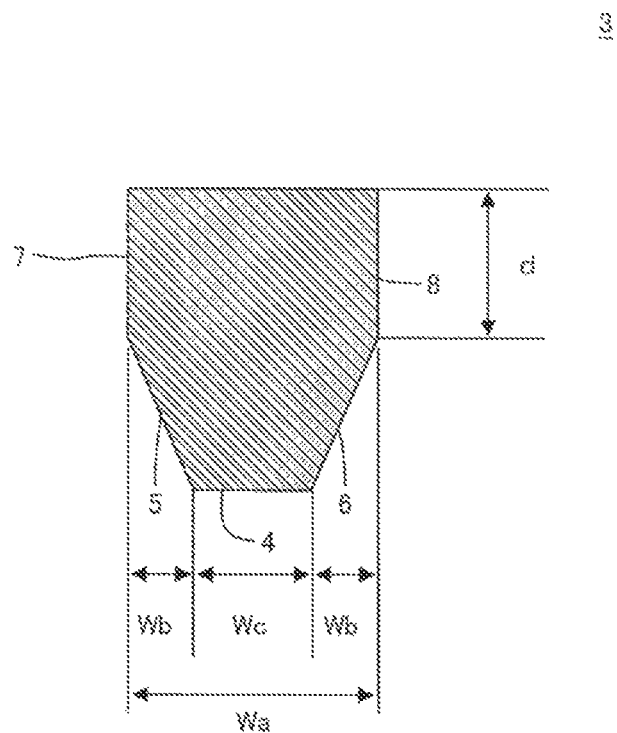
FIG. 3 is a schematic view showing a cross section of a grinding wheel portion constituting the grind processing member for use in the embodiment of the grinding method of the honeycomb structure of the present invention.
Figure 4:
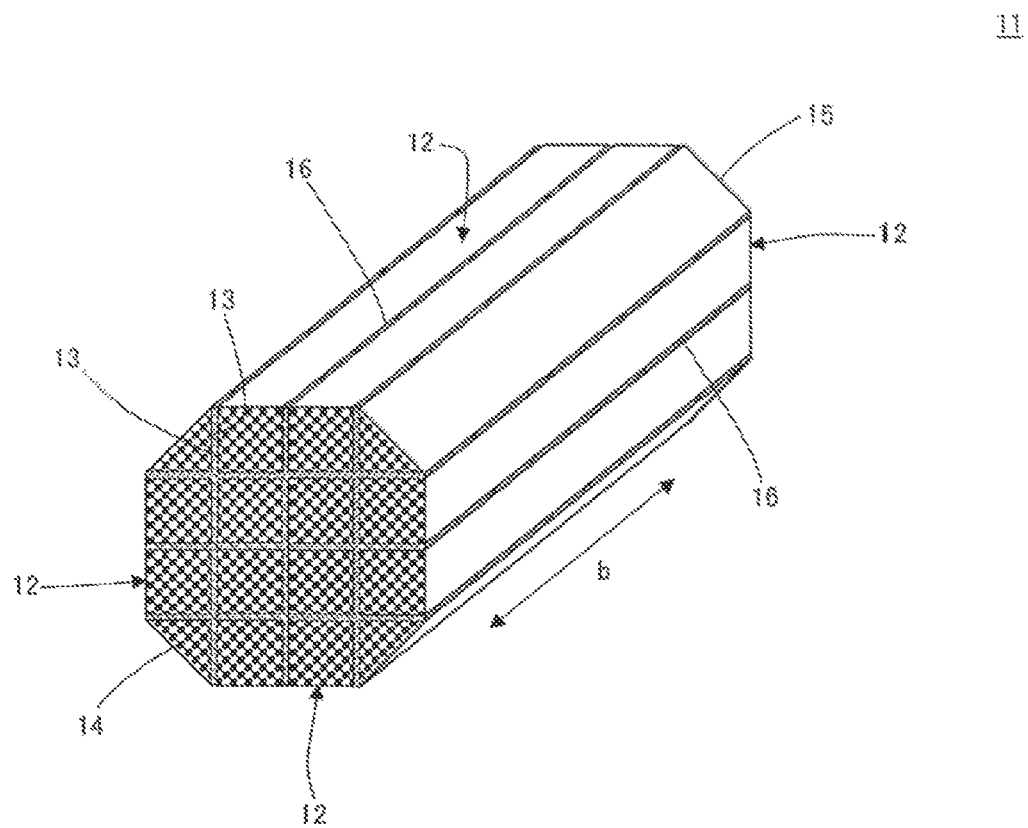
FIG. 4 is a perspective view schematically showing a joined honeycomb segment assembly to be subjected to grind processing in the embodiment of the grinding method of the honeycomb structure of the present invention.
Figure 5:
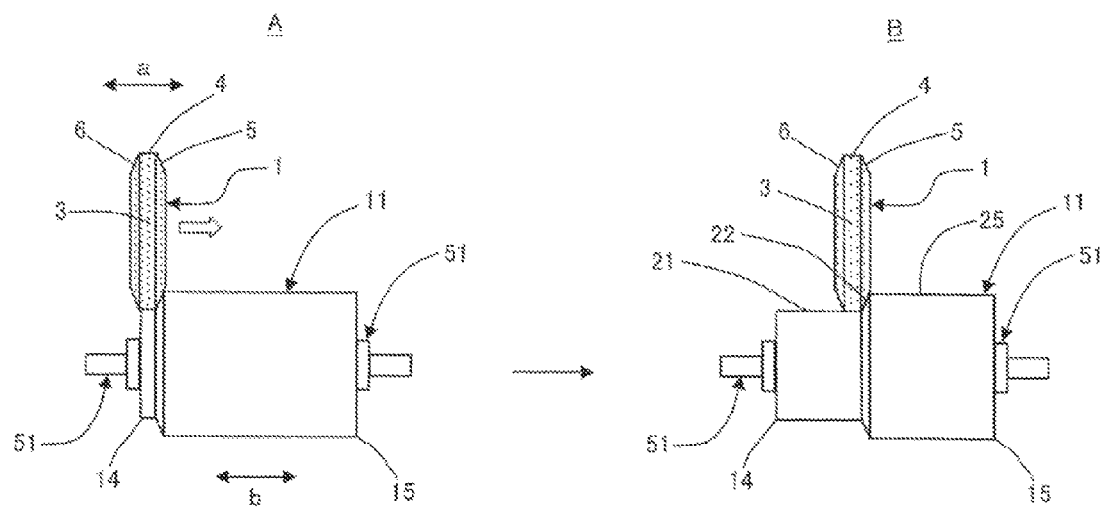
FIG. 5 is a schematic view showing a first ground region forming step in the embodiment of the grinding method of the honeycomb structure of the present invention.
Figure 6:
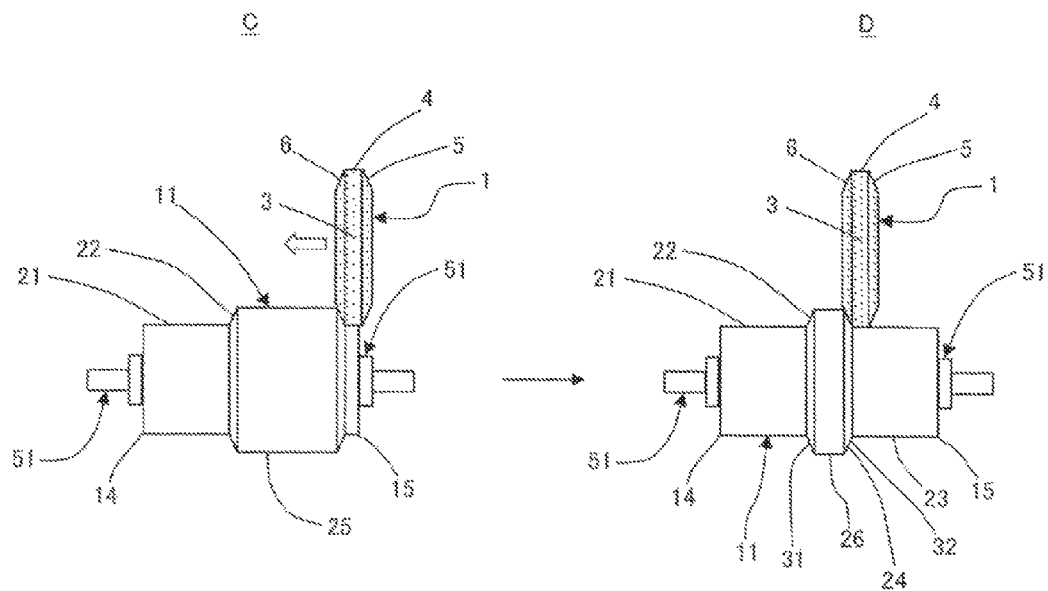
FIG. 6 is a schematic view showing a second ground region forming step in the embodiment of the grinding method of the honeycomb structure of the present invention.
Figure 7:
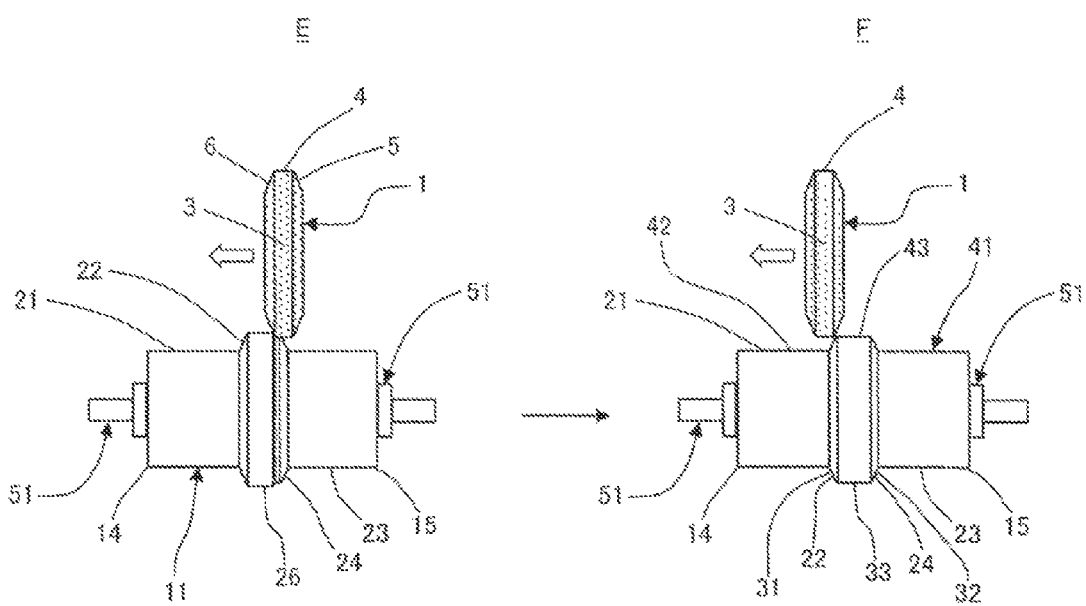
FIG. 7 is a schematic view showing a center ground surface forming step in the embodiment of the grinding method of the honeycomb structure of the present invention.
Figure 8:
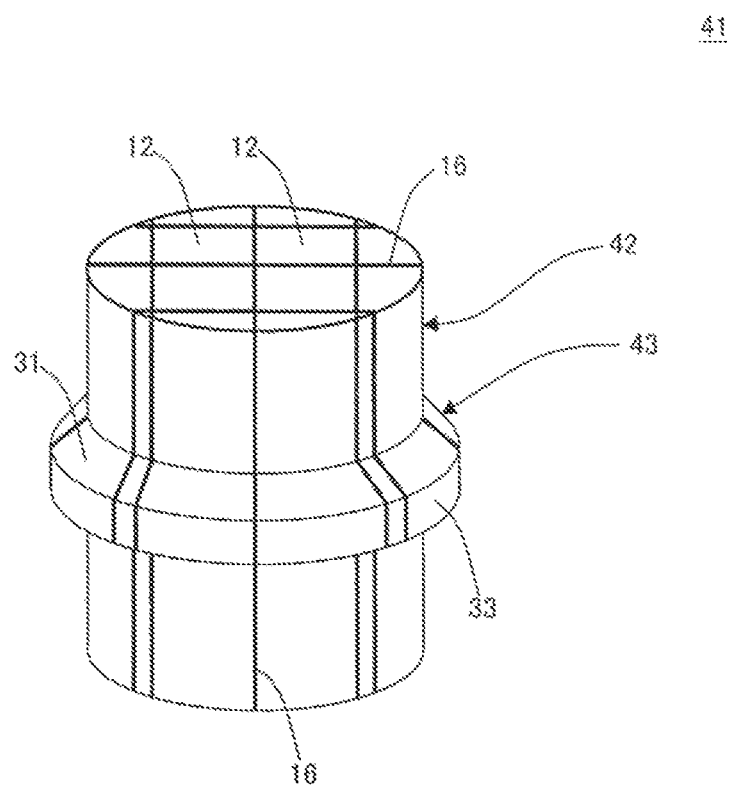
FIG. 8 is a perspective view schematically showing a honeycomb structure to be prepared in the embodiment of the grinding method of the honeycomb structure of the present invention.

Here, FIG. 1 is a front view schematically showing the grind processing member 1 for use in the embodiment of the grinding method of the honeycomb structure of the present invention. FIG. 2 is a side view schematically showing the grind processing member 1 for use in the embodiment of the grinding method of the honeycomb structure of the present invention. FIG. 3 is a schematic view showing a cross section of the grinding wheel portion constituting the grind processing member for use in the embodiment of the grinding method of the honeycomb structure of the present invention. FIG. 3 shows one of two cross sections obtained by cutting the grinding wheel portion of the grind processing member along a plane including a central axis. FIG. 4 is a perspective view schematically showing the joined honeycomb segment assembly 11 to be subjected to the grind processing in the embodiment of the grinding method of the honeycomb structure of the present invention. FIG. 5 is a schematic view showing a first ground region forming step in the embodiment of the grinding method of the honeycomb structure of the present invention. FIG. 6 is a schematic view showing a second ground region forming step in the embodiment of the grinding method of the honeycomb structure of the present invention. FIG. 7 is a schematic view showing a center ground surface forming step in the embodiment of the grinding method of the honeycomb structure of the present invention. FIG. 8 is a perspective view schematically showing the honeycomb structure 41 to be prepared in the embodiment of the grinding method of the honeycomb structure of the present invention.

As described above, the grinding method of the honeycomb structure of the present embodiment is a method of grinding the outer peripheral portion of the joined honeycomb segment assembly 11 (see FIG. 4) by use of "the grind processing member 1" (see FIG. 1 to FIG. 3) to prepare the honeycomb structure 41 having the ring-like bulge portion 43 (see FIG. 8).

As described above, in the grinding method of the honeycomb structure of the present embodiment, the first grinding wheel tapered surface 5 of the grind processing member 1 forms the first tapered portion 22 of "the complementary shape to the first grinding wheel tapered surface 5". In consequence, the shape of the first tapered portion 22 becomes "the shape to which the shape of the first grinding wheel tapered surface 5 has been transferred". Therefore, a contour accuracy of the surface of the first tapered portion 22 can be enhanced. Furthermore, during the grinding by the grind processing member 1, in the state where the central axis of the grind processing member 1 is parallel to the central axis of the joined honeycomb segment assembly 11, the grind processing member 1 is preferably moved in parallel with the central axis of the joined honeycomb segment assembly 11. In consequence, the first tapered portion 22 can be formed in a short time. Moreover, the second tapered portion 24 is similarly formed by the second grinding wheel tapered surface 6. Therefore, the contour accuracy of the processed surface can be enhanced, and the processing can be performed in the short time. Furthermore, the first ground region 21, the second ground region 23 and the center ground surface 33 are formed by the outer peripheral surface 4 of the grind processing member 1. Therefore, the contour accuracy can be enhanced, and the grind processing can be performed in the short time. Here, in the present description, "the processed surface" means the surface (the ground surface) ground and formed by the grind processing member. Moreover, "the contour accuracy" of the surface is a difference between a maximum value and a minimum value of a deviation from a design value concerning the shape of the "surface". Furthermore, "the contour accuracy" of the surface is a value calculated from the deviation between the design value and a measured value which is obtained by measuring the contour of the cross section of the honeycomb structure (the joined honeycomb segment assembly) by use of a dial meter, a three-dimensional measuring machine, a two-dimensional laser length measuring machine or the like. It can be considered that "the contour accuracy" smaller than 0.2 mm is suitable (excellent). Moreover, it can be considered that "the contour accuracy" of 0.2 mm or more is defective (poor). It is to be noted that "the contour accuracy" will be referred to as "the contour accuracy of the surface" sometimes.

Moreover, in the grinding method of the honeycomb structure of the present embodiment, the first grinding wheel tapered surface 5 of the grind processing member 1 forms the first tapered portion 22. Furthermore, the second grinding wheel tapered surface 6 forms the second tapered portion 24, and the outer peripheral surface 4 forms the first ground region 21, the second ground region 23 and the center ground surface 33. Consequently, in the grinding method of the honeycomb structure of the present embodiment, the respective surfaces (the first grinding wheel tapered surface 5, the second grinding wheel tapered surface 6 and the outer peripheral surface 4) of the one grind processing member 1 form the respective surfaces of the honeycomb structure to be obtained. Therefore, in the grinding method of the honeycomb structure of the present embodiment, the joined honeycomb segment assembly 11 is ground only by use of the one grind processing member 1, so that the desirable honeycomb structure 41 can be obtained.

(1) Grind Processing Member:

As shown in FIG. 1 to FIG. 3, the grind processing member 1 for use in the grinding method of the honeycomb structure of the present embodiment includes the disc-like disc portion 2, and the ring-like grinding wheel portion 3 disposed on the outer periphery of the disc portion 2.

The grinding wheel portion 3 has "the outer peripheral surface 4, the first grinding wheel tapered surface 5 and the second grinding wheel tapered surface 6". The outer peripheral surface 4 is the surface formed in the outer peripheral portion in parallel with the central axis. The shape of the outer peripheral surface 4 is a shape of a cylindrical outer peripheral surface. When "the outer peripheral surface 4 is formed in parallel with the central axis (the central axis of the grind processing member", it is meant that the central axis is parallel to the outer peripheral surface 4 in "the cross section" of the grind processing member "including the central axis". Consequently, when "the outer peripheral surface 4 is parallel to the central axis", "the contour accuracy of the surface" can be enhanced by grinding the joined honeycomb segment assembly in the state where central axis of the grind processing member 1 is parallel to the central axis of the joined honeycomb segment assembly 11. Furthermore, when the grind processing member 1 is moved in parallel with the central axis of the joined honeycomb segment assembly 11, a grind processing time can further be shortened. More specifically, when the joined honeycomb segment assembly 11 is ground by the grind processing member 1, the whole outer peripheral surface 4 of the grind processing member 1 comes in contact with the joined honeycomb segment assembly 11 in a cross section passing the central axes of both the grind processing member 1 and the joined honeycomb segment assembly 11. Moreover, the outer peripheral surface 4 of the grind processing member 1 becomes parallel to the ground surfaces of the joined honeycomb segment assembly 11. Therefore, a contact width between the outer peripheral surface 4 of the grind processing member 1 and the joined honeycomb segment assembly 11 is "an outer periphery width Wc" which is a width of the outer peripheral surface 4. In consequence, the whole wide outer peripheral surface 4 of the grind processing member 1 comes in contact with the joined honeycomb segment assembly 11. Therefore, even when a movement speed of the grind processing member 1 is increased, the ground surfaces of the joined honeycomb segment assembly 11 have a better contour accuracy. In consequence, the grinding method of the honeycomb structure of the present embodiment can shorten the grind processing time, and enhance the contour accuracy of "the surfaces (processed surfaces)" of the obtained honeycomb structure "which are formed by the grinding".

"The outer periphery width Wc" which is a length of the outer peripheral surface 4 of the grinding wheel portion 3 in the central axis direction a (the width of the outer peripheral surface 4 of the grinding wheel portion 3) is preferably from 9 to 15 mm, further preferably from 10 to 14 mm, and especially preferably from 11 to 13 mm. When the length is smaller than 9 mm, for enhancing "the contour accuracy of the surfaces" of the first ground region 21 and the like, a necessity of decreasing the movement speed of the grind processing member 1 arises sometimes. Moreover, when the movement speed of the grind processing member 1 is not decreased, a spiral non-ground portion is left sometimes. When the length is larger than 15 mm, a mass of the grind processing member 1 increases, and vibration at rotation ("a deviation" of the rotation center (the central axis)) takes place sometimes.

A taper width Wb of the grinding wheel portion 3 is preferably from 8 to 10 mm, further preferably from 8.4 to 9.6 mm, and especially preferably from 8.8 to 9.2 mm. When the width is smaller than 8 mm, the first grinding wheel tapered surface or the like becomes small, and the desirable first tapered surface or the like cannot easily be formed sometimes. When the width is larger than 10 mm, the outer periphery width Wc decreases. Moreover, the grind processing time lengthens, and the contour accuracy of "the surfaces" of the obtained honeycomb structure "which are formed by the grinding" deteriorate sometimes. The taper widths Wb are the lengths of the first grinding wheel tapered surface and the second grinding wheel tapered surface in the central axis direction a. The taper width Wb of the first grinding wheel tapered surface 5 and the taper width Wb of the second grinding wheel tapered surface 6 may have different sizes, but preferably have the same size.

A grinding wheel width Wa which is a length of the grinding wheel portion 3 in the central axis direction a is preferably from 25 to 35 mm, further preferably from 28 to 32 mm, and especially preferably from 29 to 31 mm. When the grinding wheel width Wa is smaller than 25 mm, a necessity of decreasing the taper width Wb or the outer periphery width Wc arises sometimes. When the grinding wheel width Wa is larger than 35 mm, the mass of the grind processing member 1 increases, and the vibration at the rotation ("the deviation" of the rotation center (the central axis)) takes place sometimes.

A length, in "a diameter direction from the central axis toward the outside" (a grinding wheel end surface diameter direction length d), of each of one end surface (one end surface 7 of the grinding wheel portion) and the other end surface (the other end surface 8 of the grinding wheel portion) of the grinding wheel portion 3 in the central axis direction is preferably from 3 to 7 mm. Furthermore, the grinding wheel end surface diameter direction length d is preferably from 4 to 6 mm, and especially preferably from 4.5 to 5.5 mm. When the length is smaller than 3 mm, a life of the grind processing member shortens sometimes. When the length is larger than 7 mm, a rigidity of the grind processing member (the grinding wheel portion) deteriorates, and the honeycomb structure having a desirable shape is not easily formed sometimes. The grinding wheel end surface diameter direction length d of the one end surface 7 of the grinding wheel portion and the grinding wheel end surface diameter direction length d of the other end surface 8 of the grinding wheel portion may be different lengths, but are preferably the same.

There is not any special restriction on a material of the grinding wheel portion 3, as long as the ceramic honeycomb segments 12 constituting the joined honeycomb segment assembly 11 and joining portions 16 joining the ceramic honeycomb segments 12 to one another can be ground. Specifically, examples of the material of the grinding wheel portion 3 include metal bonded (bound) diamond grains.

A diameter of a cross section of the grind processing member 1 which is perpendicular to the central axis is preferably from 300 to 400 mm, further preferably from 320 to 380 mm, and especially preferably from 340 to 360 mm. When the diameter is smaller than 300 mm, the taper width Wb and the grinding wheel end surface diameter direction length d of the grinding wheel portion 3 are not easily set to desirable lengths sometimes. Moreover, for acquiring a processing speed, it is necessary to increase the grinding wheel rotation speed, which results in enlargement of a device sometimes. When the diameter is larger than 400 mm, a necessity of enlarging the device to rotate and move the grind processing member 1 arises sometimes.

There is not any special restriction on a device in which the grind processing member 1 is mounted (attached) for use, and the device may be any device that can rotate the grind processing member 1 "around the central axis", and move the grind processing member 1. The device is further preferably a device capable of moving the grind processing member 1 in the central axis direction.

The disc portion 2 constituting the grind processing member 1 is a disc-like member. Examples of a shape of the disc portion 2 include a round plate shape having a dented central portion, and a round plate shape having a pore at a predetermined position. The examples of the shape also include a shape like "a wheel of a structure where a rim positioned in an outer periphery is connected to a hub positioned in the center via a spoke". In the grind processing member 1, the grinding wheel portion 3 is disposed on the outer periphery of the disc portion 2. A thickness of the disc portion 2 is preferably the same as the grinding wheel width Wa of the grinding wheel portion 3. There is not any special restriction on a material of the disc portion 2, but the material is preferably carbon steel. A central axis portion of the disc portion 2 of the grind processing member 1 is preferably attached to a rotary shaft of the device provided with the grind processing member 1 for use.

(2) Joined Honeycomb Segment Assembly:

The joined honeycomb segment assembly 11 which is the assembly to be ground in the grinding method of the honeycomb structure of the present embodiment is formed by joining the side surfaces 13 of the plurality of ceramic honeycomb segments 12 to one another. The ceramic honeycomb segments 12 are joined to each other by the joining portion 16.

Each of the ceramic honeycomb segments 12 has porous partition walls with which a plurality of cells extending from one end surface to the other end surface is formed. Moreover, in the ceramic honeycomb segment 12, plugged portions are formed in open frontal areas of the predetermined cells in the one end surface and open frontal areas of the remaining cells in the other end surface. Moreover, the predetermined cells and the remaining cells are alternately arranged, and checkered patterns are formed in both the end surfaces of the ceramic honeycomb segment 12. It is to be noted that the ceramic honeycomb segment does not have to be provided with the plugged portions.

A material constituting the ceramic honeycomb segments 12 is preferably a silicon-silicon carbide composite material, silicon carbide, or silicon. Here, the silicon-silicon carbide composite material is a material in which "silicon carbide particles are bound by metal silicon in a state where pores are formed among the silicon carbide particles".

There is not any special restriction on a porosity (%) of the ceramic honeycomb segments 12, but the porosity is preferably from 30 to 80%, and further preferably from 40 to 65%. When the porosity is in such a range, it is possible to decrease a pressure loss while maintaining strength. When the porosity is smaller than 30%, the pressure loss increases sometimes. When the porosity is in excess of 80%, the strength deteriorates sometimes. The porosity is a value measured by Archimedes method.

An average pore diameter (μm) of the ceramic honeycomb segments 12 is preferably from 5 to 50 μm, and further preferably from 7 to 35 μm. When the average pore diameter is in such a range, it is possible to effectively collect a particulate matter (PM). When the average pore diameter is smaller than 5 μm, clogging with the PM easily takes place sometimes. When the average pore diameter is in excess of 50 μm and the prepared honeycomb structure is used as a diesel particulate filter (DPF), the PM is not collected by the honeycomb structure but passes through the honeycomb structure. The average pore diameter is a value measured by a mercury porosimeter.

When the material constituting the ceramic honeycomb segments 12 is the silicon-silicon carbide composite material, an average particle diameter of the silicon carbide particles is preferably from 5 to 100 μm. With such an average particle diameter, the porosity and average pore diameter of the ceramic honeycomb segments 12 are easily controlled in the above range. When the average particle diameter is smaller than 5 μm, the average pore diameter excessively decreases sometimes. When the average particle diameter is larger than 100 μm, the porosity excessively decreases sometimes. The average particle diameter of silicon carbide is a value measured in conformity to JIS R 1629.

There is not any special restriction on a thickness of each of the partition walls of the ceramic honeycomb segments 12, but the thickness is preferably from 50 to 2000 μm. When the partition wall thickness is smaller than 50 μm, strength of the prepared honeycomb structure deteriorates sometimes. When the partition wall thickness is larger than 2000 μm, the pressure loss of the prepared honeycomb structure increases sometimes.

There is not any special restriction on a cell density (cells/cm$^2$) of the ceramic honeycomb segments 12, but the cell density is preferably from 0.9 to 311 cells/cm$^2$, and further preferably from 7.8 to 62 cells/cm$^2$. When the cell density is smaller than 0.9 cell/cm$^2$ and the prepared honeycomb structure is used as the DPF, an effective filter area decreases sometimes. When the cell density is larger than 311 cells/cm$^2$ and the prepared honeycomb structure is used as the DPF, the pressure loss increases sometimes.

There is not any special restriction on a cell shape of the ceramic honeycomb segments 12, and examples of the cell shape include a triangular shape, a quadrangular shape, a hexagonal shape, an octagonal shape, a round shape, and any combination of these shapes. It is to be noted that the cell shape of each of the ceramic honeycomb segments 12 is a cell shape in a cross section of the ceramic honeycomb segment 12 which is vertical to the central axis direction (a cell extending direction) of the ceramic honeycomb segment.

An example of a material of the joining portions 16 which join the ceramic honeycomb segments 12 to one another include is a material obtained by adding, to ceramic powder, an inorganic fiber such as a ceramic fiber, an organic and/or inorganic binder and a dispersion medium such as water. An example of the ceramic powder is powder of silica, alumina, mullite, cordierite or the like.

In the grinding method of the honeycomb structure of the present embodiment, as shown in FIG. 4, a shape of the joined honeycomb segment assembly 11 is a columnar shape including an octagonal cross section perpendicular to the central axis direction. In the grinding method of the honeycomb structure of the present embodiment, the shape of the joined honeycomb segment assembly 11 is preferably the columnar shape including the octagonal cross section perpendicular to the central axis direction, but the shape is not limited to this example. For example, the joined honeycomb segment assembly 11 preferably has a columnar shape in which "the shape of the cross section perpendicular to the central axis direction is a round shape or a polygonal shape". The shape of the cross section of the joined honeycomb segment assembly 11 which is perpendicular to the central axis direction is further preferably a quadrangular shape, a hexagonal shape, or an octagonal shape. In the grinding method of the honeycomb structure of the present embodiment, the joined honeycomb segment assembly 11 having the polygonal cross section perpendicular to the central axis direction is also subjected to grind processing by use of the one grind processing member, so that the honeycomb structure can be obtained.

(3) Grinding Method of Honeycomb Structure:

Hereinafter, the steps of the grinding method of the honeycomb structure of the present embodiment will be described in more detail.

(3-1) First Ground Region Forming Step:

In the first ground region forming step, as shown in FIG. 5, the grind processing member 1 is moved "from the first end 14 toward the second end 15 of the joined honeycomb segment assembly 11 (a moving direction)". In the grinding method of the honeycomb structure of the present embodiment, the grind processing member 1 is moved in parallel with the central axis of the joined honeycomb segment assembly 11, to prepare the honeycomb structure in which the shape of "the cross section perpendicular to the central axis" is round. A grinding state A on the left side of the paper surface of FIG. 5 shows that the grind processing member 1 starts to grind the first end 14 of the joined honeycomb segment assembly 11. A grinding state B on the right side of the paper surface of FIG. 5 shows that the grind processing member 1 forms the first ground region 21 and the first tapered portion 22 in the joined honeycomb segment assembly 11. In FIG. 5, both end surfaces of the joined honeycomb segment assembly 11 are held by a rotating member 51 of a rotating device. At this time, a rotational axis of the rotating member 51 and the central axis of the joined honeycomb segment assembly 11 are the same axis. Then, the joined honeycomb segment assembly 11 rotates around the central axis by rotation driving of the rotating member 51. In FIG. 5, "a white arrow" drawn beside the grind processing member indicates the moving direction of the grind processing member. Moreover, also in the other drawings, "a white arrow" drawn beside the grind processing member similarly indicates the moving direction of the grind processing member.

A movement speed of the grind processing member 1 is preferably from 200 to 400 mm/minute, further preferably from 240 to 360 mm/minute, and especially preferably from 280 to 320 mm/minute. When the movement speed is higher than 400 mm/minute, the contour accuracy of the surfaces of the first ground region 21 and the first tapered portion 22 deteriorate sometimes. When the movement speed is lower than 200 mm/minute, a grinding time excessively lengthens sometimes. It is to be noted that the movement speeds of the grind processing member 1 in the second ground region forming step and the center ground surface forming step are also preferably in the above range.

When the grind processing member 1 is moved from the first end 14 toward the second end 15 of the joined honeycomb segment assembly 11, the joined honeycomb segment assembly is rotated around the central axis, and the grind processing member is moved while rotating around the central axis. There is not any special restriction on a rotation speed of the joined honeycomb segment assembly 11 during the rotation of the assembly around the central axis, but the rotation speed is preferably from 100 to 200 rpm, further preferably from 120 to 180 rpm, and especially preferably from 140 to 160 rpm. When the rotation speed is lower than 100 rpm, the contour accuracy of the surfaces of the first ground region 21 and the first tapered portion 22 deteriorate sometimes. When the rotation speed is higher than 200 rpm, a load of the rotating device increases, which requires a large-scale device sometimes. Moreover, there is not any special restriction on the rotation speed of the grind processing member during the rotation of the member around the central axis, but the rotation speed is preferably from 2000 to 6000 rpm, further preferably from 3000 to 5000 rpm, and especially preferably from 3500 to 4500 rpm. When the rotation speed is lower than 2000 rpm, the contour accuracy of the surfaces of the first ground region 21 and the first tapered portion 22 deteriorate sometimes. When the rotation speed is higher than 6000 rpm, the load of the rotating device increases, which requires the large-scale device sometimes. It is to be noted that the rotation speeds of the joined honeycomb segment assembly 11 in the second ground region forming step and the center ground surface forming step are also preferably in the above range. Furthermore, the rotation speeds of the grind processing member 1 in the second ground region forming step and the center ground surface forming step are also preferably in the above range.

Moreover, when the grinding wheel portion 3 of the grind processing member 1 grinds a part of the outer peripheral portion of the joined honeycomb segment assembly 11 on the first end 14 side, the outer peripheral surface 4 of the grinding wheel portion 3 forms the first ground region 21. Moreover, the first grinding wheel tapered surface 5 of the grinding wheel portion 3 forms the first tapered portion 22. As described above, the surfaces (the outer peripheral surface 4 and the first grinding wheel tapered surface 5) of the grinding wheel portion 3 of the grind processing member 1 grind the joined honeycomb segment assembly 11, and hence it is possible to enhance "the contour accuracy of the surfaces" of the ground portions. A taper angle of the first grinding wheel tapered surface 5 of the grinding wheel portion 3 of the grind processing member 1 is the same as a taper angle of the first tapered portion 22 of the joined honeycomb segment assembly 11 (the honeycomb structure 41).

The first ground region forming step is a step of forming the first ground region 21 and the first tapered portion 22 in the joined honeycomb segment assembly 11 as described above.

After forming the first ground region 21 and the first tapered portion 22 in the joined honeycomb segment assembly 11, the grind processing member 1 is preferably detached from the joined honeycomb segment assembly 11 and moved to the second end 15 of the joined honeycomb segment assembly 11. Afterward, the second ground region forming step is preferably performed.

In the grinding method of the honeycomb structure of the present embodiment, the first grinding wheel tapered surface 5 of the grind processing member 1 forms the first tapered portion 22, and the second grinding wheel tapered surface 6 of the grind processing member 1 forms the second tapered portion 24. Therefore, when the first ground region forming step shifts to the second ground region forming step, it is not necessary to change a direction of the grind processing member (a facing direction of the first grinding wheel tapered surface 5 and the second grinding wheel tapered surface 6).

(3-2) Second Ground Region Forming Step:

In the second ground region forming step, as shown in FIG. 6, the grind processing member 1 is moved "from the second end 15 toward the first end 14 of the joined honeycomb segment assembly 11". In the grinding method of the honeycomb structure of the present embodiment, the grind processing member 1 is moved in parallel with the central axis of the joined honeycomb segment assembly 11, to prepare the honeycomb structure in which the shape of "the cross section perpendicular to the central axis" is round. A grinding state C on the left side of the paper surface of FIG. 6 shows that the grind processing member 1 starts to grind the second end 15 of the joined honeycomb segment assembly 11. A grinding state D on the right side of the paper surface of FIG. 6 shows that the grind processing member 1 forms the second ground region 23 and the second tapered portion 24 in the joined honeycomb segment assembly 11. In FIG. 6, both the end surfaces of the joined honeycomb segment assembly 11 are held by the rotating member 51 of the rotating device. At this time, the rotational axis of the rotating member 51 and the central axis of the joined honeycomb segment assembly 11 are the same axis. Then, the joined honeycomb segment assembly 11 rotates around the central axis by the rotation driving of the rotating member 51.

In the second ground region forming step, as shown in FIG. 6, the grinding wheel portion 3 of the grind processing member 1 grinds "a part of the non-ground region 25 of the joined honeycomb segment assembly 11 on the second end 15 side". Consequently, the outer peripheral surface 4 of the grinding wheel portion 3 forms the second ground region 23, and the second grinding wheel tapered surface 6 of the grinding wheel portion 3 forms the second tapered portion 24 which tapers toward the second end 15, "between the remaining non-ground region 26 which is left non-ground and the second ground region 23". Consequently, the joined honeycomb segment assembly 11 is ground by the surfaces (the outer peripheral surface 4 and the second grinding wheel tapered surface 6) of the grinding wheel portion 3 of the grind processing member 1, and hence it is possible to enhance "the contour accuracy of the surfaces" of the ground portions. The taper angle of the second grinding wheel tapered surface 6 of the grinding wheel portion 3 of the grind processing member 1 is the same as the taper angle of the second tapered portion 24 of the joined honeycomb segment assembly 11 (the honeycomb structure 41).

The second ground region forming step is a step of forming the second ground region 23 and the second tapered portion 24 in the joined honeycomb segment assembly 11 as described above.

After forming the second ground region 23 and the second tapered portion 24 in the joined honeycomb segment assembly 11, the grind processing member 1 is preferably detached from the joined honeycomb segment assembly 11 and moved to one end of the remaining non-ground region 26 of the joined honeycomb segment assembly 11. The one end of the remaining non-ground region 26 of the joined honeycomb segment assembly 11 is the end in the cell extending direction. Afterward, the center ground surface forming step is preferably performed.

(3-3) Center Ground Surface Forming Step:

In the center ground surface forming step, as shown in FIG. 7, the grind processing member 1 is moved, so that the grinding wheel portion 3 of the grind processing member 1 grinds "the remaining non-ground region 26 of the outer peripheral portion of the joined honeycomb segment assembly 11". In the grinding method of the honeycomb structure of the present embodiment, the grind processing member 1 is moved in parallel with the central axis of the joined honeycomb segment assembly 11, to prepare the honeycomb structure in which the shape of "the cross section perpendicular to the central axis" is round. A grinding state E on the left side of the paper surface of FIG. 7 shows that the grind processing member 1 starts to grind the remaining non-ground region 26 of the joined honeycomb segment assembly 11. A grinding state F on the right side of the paper surface of FIG. 7 shows that the grind processing member 1 forms the center ground surface 33 in the joined honeycomb segment assembly 11. In FIG. 7, both the end surfaces of the joined honeycomb segment assembly 11 are held by the rotating member 51 of the rotating device. At this time, the rotational axis of the rotating member 51 and the central axis of the joined honeycomb segment assembly 11 are the same axis. Then, the joined honeycomb segment assembly 11 rotates around the central axis by the rotation driving of the rotating member 51.

In the center ground surface forming step, the outer peripheral surface 4 of the grinding wheel portion 3 of the grind processing member 1 forms the center ground surface 33 of the joined honeycomb segment assembly 11. Consequently, the center ground surface 33 is formed by the surface (the outer peripheral surface 4) of the grind processing member 1, and hence the contour accuracy of the center ground surface 33 can be enhanced.

The center ground surface forming step is a step of forming the center ground surface 33 in the joined honeycomb segment assembly 11 as described above.

With the result that the center ground surface 33 is formed in the joined honeycomb segment assembly 11, the honeycomb structure 41 including the cylindrical honeycomb base material 42 and the ring-like bulge portion 43 can be obtained.

(4) Honeycomb Structure:

As shown in FIG. 8, the honeycomb structure obtained by the grinding method of the honeycomb structure of the present embodiment includes the cylindrical honeycomb base material 42 and the ring-like bulge portion 43. In the honeycomb structure 41 shown in FIG. 8, the cells and partition walls of the ceramic honeycomb segments 12 are omitted. It is to be noted that the grinding method of the honeycomb structure of the present invention may be a method of preparing the honeycomb structure in which "the shape of the cross section perpendicular to the central axis is elliptic". In this case, the shape of the cross section of the ring-like bulge portion "which is perpendicular to the central axis" is also preferably elliptic. Moreover, as described above, in the preparation of the honeycomb structure in which a shape of cross sections of the honeycomb base material and ring-like bulge portion "which are perpendicular to the central axis" is elliptic, the grind processing member and the joined honeycomb segment assembly are preferably operated as follows. That is, the elliptic shape can be obtained by changing a distance to press the grind processing member (a distance between the central axis of the joined honeycomb segment assembly and the grind processing member) in accordance with a phase of rotation (a half cycle corresponds to one cycle) while rotating the joined honeycomb segment assembly. At this time, the grind processing member periodically changes the distance between the central axis of the joined honeycomb segment assembly and the grind processing member. In the preparation of the honeycomb structure in which the shape of the cross sections of the honeycomb base material and ring-like bulge portion "which are perpendicular to the central axis" is elliptic, the above operation is preferably performed in the first ground region forming step, the second ground region forming step and the center ground surface forming step, respectively. That is, in the first ground region forming step, the distance between the central axis of the joined honeycomb segment assembly and the grind processing member is preferably changed, while moving the grind processing member 1 from the first end 14 toward the second end 15 of the joined honeycomb segment assembly 11. Moreover, in the second ground region forming step, the distance between the central axis of the joined honeycomb segment assembly and the grind processing member is preferably changed, while moving the grind processing member 1 from the second end 15 toward the first end 14 of the joined honeycomb segment assembly 11. Furthermore, in the center ground surface forming step, the distance between the central axis of the joined honeycomb segment assembly and the grind processing member is preferably changed, while moving the grind processing member 1 in parallel with the central axis of the joined honeycomb segment assembly 11.

The honeycomb base material 42 is formed by joining the side surfaces of the plurality of ceramic honeycomb segments 12 to one another. The ceramic honeycomb segments 12 are joined to each other by the joining portion 16. The ring-like bulge portion 43 surrounds the outer periphery of the honeycomb base material 42 and protrudes from the outer periphery of the honeycomb base material 42 toward the outside in a flange manner. Moreover, the ring-like bulge portion 43 is surrounded by "the first tapered surface 31, the second tapered surface 32 and the center ground surface 33".

EXAMPLES

Hereinafter, the present invention will be described in more detail with respect to examples, but the present invention is not limited to these examples.

Example 1

First, a joined honeycomb segment assembly was prepared. Specifically, 80 parts by mass of SiC powder and 20 parts by mass of metal Si powder were first mixed to obtain a ceramic raw material. A pore former, a binder, a surfactant and water were added to the obtained ceramic raw material, to prepare a green body having plasticity. As the pore former, starch was used. As the binder, methylcellulose and hydroxypropoxyl methylcellulose were used. As the surfactant, sodium laurate was used. To 100 parts by mass of ceramic raw material, there were added 5 parts by mass of pore former, 3 parts by mass of methylcellulose, 3 parts by mass of hydroxypropoxyl methylcellulose, 1 part by mass of surfactant, and 32 parts by mass of water. The obtained green body was extruded using a honeycomb structure forming die, and dried by microwaves and hot air, to obtain a dried honeycomb body.

Next, the obtained dried honeycomb body was degreased at about 400° C. in an air atmosphere. Afterward, the degreased dried honeycomb body was fired at about 1450° C. in an inert-argon atmosphere, and SiC crystal particles were bound by Si, to obtain a ceramic honeycomb segment.

In the obtained ceramic honeycomb segment, a cross section which is perpendicular to a cell extending direction was a regular tetragon with a side of 30 mm, and a length in the cell extending direction was 150 mm. Moreover, in the ceramic honeycomb segment, a cell density was 300 cells/$cm^2$, and a partition wall thickness was 300 µm.

By the above method, 12 ceramic honeycomb segments were prepared. Then, each of four of the 12 ceramic honeycomb segments was cut into two equal parts so as to obtain two ceramic honeycomb segments each having an isosceles triangular cross section perpendicular to the cell extending direction.

Side surfaces of the obtained 16 ceramic honeycomb segments were joined to one another by a joining material, and dried, to obtain a joined honeycomb segment assembly 11 having an octagonal cross section perpendicular to a central axis as shown in FIG. 4. As the joining material, a material obtained by adding a silica fiber, an organic binder and water to alumina powder was used.

Next, the joined honeycomb segment assembly was ground using a grind processing member to obtain a honeycomb structure. Specifically, the honeycomb structure was obtained as follows.

First, a first ground region forming step was performed (see FIG. 5). Specifically, in a state where a central axis of a grind processing member 1 was parallel to a central axis of the joined honeycomb segment assembly 11, the grind processing member 1 was moved from a first end 14 toward a second end 15 of the joined honeycomb segment assembly 11 in parallel with the central axis of the joined honeycomb segment assembly 11.

When the grind processing member 1 was moved from the first end 14 toward the second end 15 of the joined honeycomb segment assembly 11, the joined honeycomb segment assembly was rotated around the central axis, and the grind processing member was moved while rotating around the central axis. The first end 14 of the joined honeycomb segment assembly 11 was one end of the joined honeycomb segment assembly 11, and the second end 15 of the joined honeycomb segment assembly 11 was the other end of the joined honeycomb segment assembly 11. Then, as described above, the grind processing member 1 was moved from the first end 14 toward the second end 15 of the joined honeycomb segment assembly 11, so that a grinding wheel portion 3 of the grind processing member 1 ground a part of an outer peripheral portion of the joined honeycomb segment assembly 11 on a first end 14 side. Moreover, when the grinding wheel portion 3 of the grind processing member 1 ground a part of the outer peripheral portion of the joined honeycomb segment assembly 11 on the first end 14 side, an outer peripheral surface 4 of the grinding wheel portion 3 formed a first ground region 21. Moreover, a first grinding wheel tapered surface 5 of the grinding wheel portion 3 formed a first tapered portion 22.

Next, a second ground region forming step was performed (see FIG. 6). The grind processing member 1 was moved from the second end 15 toward the first end 14 of the joined honeycomb segment assembly 11 in parallel with the central axis of the joined honeycomb segment assembly 11. Consequently, the grinding wheel portion 3 of the grind processing member 1 ground "a part of a non-ground region 25 of the joined honeycomb segment assembly 11 on a second end 15 side". In consequence, the outer peripheral surface 4 of the grinding wheel portion 3 formed a second ground region 23, and a second grinding wheel tapered surface 6 of the grinding wheel portion 3 formed a second tapered portion 24 which tapered toward the second end 15, "between a remaining non-ground region 26 which was left non-ground and the second ground region 23". When the grinding wheel portion 3 of the grind processing member 1 ground "a part of the non-ground region 25 of the joined honeycomb segment assembly 11 on the second end 15 side", the central axis of the grind processing member 1 was parallel to the central axis of the joined honeycomb segment assembly 11. Furthermore, when the grind processing member 1 was moved from the second end 15 toward the first end 14 of the joined honeycomb segment assembly 11, the joined honeycomb segment assembly was rotated around the central axis. Moreover, the grind processing member was moved while rotating around the central axis. At this time, the central axis of the grind processing member 1 was parallel to the central axis of the joined honeycomb segment assembly 11.

Next, a center ground surface forming step was performed. The grind processing member 1 was moved in parallel with the central axis of the joined honeycomb segment assembly 11, so that the grinding wheel portion 3 of the grind processing member 1 ground the remaining non-ground region 26 of the outer peripheral portion of the joined honeycomb segment assembly 11. When the grind processing member 1 was moved in parallel with the central axis of the joined honeycomb segment assembly 11, the joined honeycomb segment assembly 11 was rotated around the central axis, and the grind processing member 1 was moved while rotating around the central axis. At this time, the central axis of the grind processing member 1 was parallel to the central axis of the joined honeycomb segment assembly 11. Consequently, there was formed a center ground surface 33 which directly came in contact with "a first tapered surface 31 which was a tapered surface of the first tapered portion 22 and a second tapered surface 32 which was a tapered surface of the second tapered portion 24". Then, a honeycomb structure 41 including a cylindrical honeycomb base material 42 and a ring-like bulge portion 43 was prepared as shown in FIG. 8.

As shown in FIG. 1 to FIG. 3, the grind processing member 1 included a disc-like disc portion 2 and the ring-like grinding wheel portion 3 disposed on an outer periphery of the disc portion 2. Furthermore, in the grind processing member 1, the grinding wheel portion 3 had "the outer peripheral surface 4, the first grinding wheel tapered surface 5 and the second grinding wheel tapered surface 6". The outer peripheral surface 4 was formed on the outer peripheral portion in parallel with the central axis (the central axis of the grind processing member 1). Moreover, the first grinding wheel tapered surface 5 was "the surface formed at one end in a central axis direction a in such a tapered manner as to decrease an outer diameter of a tip" of the grinding wheel portion 3. The second grinding wheel tapered surface 6 was "the surface formed at the other end in the central axis direction a in such a tapered manner as to decrease the outer diameter of the tip" of the grinding wheel portion 3.

In the first ground region forming step, the second ground region forming step and the center ground surface forming step, a rotation number of the grind processing member was 6600 rpm. Moreover, a rotation number of the joined honeycomb segment assembly was 200 rpm. Furthermore, a movement speed of the grind processing member (a feeding speed (a flat portion)) during the grinding of the joined honeycomb segment assembly was 250 mm/minute. It is to be noted that in Table 1, "the feeding speed (the flat portion)" means the movement speed of the grind processing member during the formation of the first ground region, the second ground region, and the center ground surface (the surface parallel to the central axis of the joined honeycomb segment assembly). Moreover, "a total time" of the first ground region forming step, the second ground region forming step and the center ground surface forming step was 45 seconds. Furthermore, the grind processing member had a grinding wheel width Wa of 30 mm, a taper width Wb of 10 mm, and an outer periphery width Wc of 10 mm. Additionally, a grinding wheel end surface diameter direction length (a grinding wheel diameter direction length) d of the grind processing member was 3 mm.

In the obtained honeycomb structure 41, side surfaces of a plurality of ceramic honeycomb segments 12 were joined to one another by joining portions 16. The ring-like bulge portion 43 surrounded an outer periphery of the honeycomb base material 42, protruded from the outer periphery of the honeycomb base material 42 toward the outside in a flange manner, and had "a first tapered surface 31, a second tapered surface 32 and a center ground surface 33". A shape of "a cross section" of the honeycomb base material 42 "which was perpendicular to the central axis" was round. Moreover, a shape of the center ground surface 33 in "the cross section" of the ring-like bulge portion 43 "which was perpendicular to the central axis" was round.

Moreover, a length of the obtained honeycomb structure in the cell extending direction (the central axis direction) was 150 mm, and a diameter of each end surface of the honeycomb structure was 120 mm. Furthermore, a diameter of a cross section of the honeycomb structure" which was perpendicular to the cell extending direction and cut the center ground surface of the ring-like bulge portion" was 130 mm. Additionally, a length of the center ground surface of the ring-like bulge portion in "the cell extending direction" was 30 mm. Moreover, the ring-like bulge portion was formed in "a central portion" of the honeycomb base material "in the cell extending direction". Furthermore, a thickness of the ring-like bulge portion (a length in a diameter direction) was 5 mm.

As to the obtained honeycomb structure, evaluation of "a contour accuracy" of a ground surface (which was a surface formed by the grinding, i.e., a side surface of the honeycomb base material (a portion excluding the ring-like bulge portion) was performed by the following method. The results are shown in Table 1. Moreover, "a grinding wheel life test" was carried out by the following method.

(Contour Accuracy of Surface)

The contour accuracy was measured using a dial gauge (trade name: 2046S manufactured by Mitutoyo Co.). Specifically, a probe of the dial gauge was scanned from one end of the honeycomb structure to a root portion of the ring-like bulge portion along the side surface of the honeycomb base material in parallel with the central axis direction. The root portion of the ring-like bulge portion is a boundary portion between the ring-like bulge portion and the side surface of the honeycomb base material. A measured value at the end of the honeycomb structure was used as a reference value, a read value at the "end" was set to 0, and the contour accuracy (mm) was obtained by subtracting a minimum value from a maximum value of the measured value after the measurement.

(Grinding Wheel Life Test)

"An operation of grinding the joined honeycomb segment assembly to prepare the honeycomb structure" was repeated 1000 times by use of the same grind processing member, to prepare 1000 honeycomb structures. After preparing the 1000 honeycomb structures, a state of the grind processing member was observed. When a grinding wheel end surface diameter direction length d of 1 mm or more was acquired, it was considered that the grind processing member had "a long life". When the grinding wheel end surface diameter direction length d was smaller than 1 mm, it was considered that the grind processing member had "a short life". When the grinding wheel end surface diameter direction length d was 0 mm due to wear, the grinding wheel end surface diameter direction length d was included in the length smaller than 1 mm.

form the first tapered surface and the second tapered surface by corner portions of the grind processing member.

When the grind processing member was obliquely moved to form the first tapered surface and the second tapered surface, a movement speed of the grind processing member (a feeding speed (a tapered portion)) was 20 mm/minute. It is to be noted that "the feeding speed (the tapered portion)" in obliquely moving the grind processing member is a speed of the grind processing member in the moving direction (a feeding direction). Moreover, "a total time" of a first ground region forming step, a second ground region forming step and a center ground surface forming step was 95 seconds.

TABLE 1

| | Grinding method | Presence of taper of grinding wheel portion | Feeding speed (flat portion) [mm/min.] | Feeding speed (tapered portion) [mm/min.] | Total time [seconds] | Grinding wheel width Wa [mm] | Taper width Wb [mm] | Outer periphery width Wc [mm] | Grinding wheel dia. direction length d [mm] | Contour deg. [mm] |
|---|---|---|---|---|---|---|---|---|---|---|
| Example 1 | Tapered portion: shape of grinding | Present | 250 | — | 45 | 30 | 10 | 10 | 3 | 0.1 |
| Example 2 | wheel portion is transferred | Present | 250 | — | 45 | 25 | 8 | 9 | 3 | 0.1 |
| Example 3 | (during grinding, grinding wheel | Present | 250 | — | 45 | 35 | 10 | 15 | 3 | 0.1 |
| Example 4 | portion is moved in parallel with | Present | 250 | — | 45 | 30 | 10 | 10 | 7 | 0.1 |
| Example 5 | central axis of joined honeycomb | Present | 250 | — | 45 | 20 | 7 | 6 | 3 | 1.0 |
| Example 6 | segment assembly). | Present | 250 | — | 45 | 20 | 5 | 10 | 3 | 0.5 |
| Example 7 | | Present | 250 | — | 45 | 30 | 12 | 6 | 3 | 1.0 |
| Example 8 | | Present | 250 | — | 45 | 30 | 10 | 10 | 10 | 0.3 |
| Example 9 | | Present | 500 | — | 23 | 40 | 10 | 20 | 3 | 0.5 |
| Comparative Example 1 | Tapered portion: grinding wheel portion is obliquely fed to perform shape processing. | None | 250 | 20 | 95 | 20 | 0 | 20 | 5 | 0.3 |

Examples 2 to 9

The procedures of Example 1 were repeated except that conditions during grinding of a joined honeycomb segment assembly by a grind processing member were changed as shown in Table 1, to prepare honeycomb structures. As to each obtained honeycomb structure, evaluation of "a contour accuracy of a surface" was performed by the above method. The results are shown in Table 1.

Comparative Example 1

The procedures of Example 1 were repeated, except that a grind processing member was changed to a grind processing member which was not tapered and a first tapered surface and a second tapered surface of a honeycomb structure (a joined honeycomb segment assembly) were formed while obliquely moving the grind processing member, to prepare the honeycomb structure. Here, "obliquely moving the grind processing member" means that the grind processing member is moved in a direction which is not parallel to a central axis of the joined honeycomb segment assembly. That is, "obliquely moving the grind processing member" means that the grind processing member is moved so that "a moving direction of the grind processing member is an oblique direction (a direction along a tapered shape to be prepared" to a central axis direction of the joined honeycomb segment assembly". As the grind processing member, there was used a columnar grinding wheel having a grinding wheel width Wa (an outer periphery width Wc) of 20 mm and a grinding wheel end surface diameter direction length d of 5 mm. Moreover, when the first tapered surface and the second tapered surface were formed, the grind processing member was moved (obliquely moved) in a direction different from an extending direction of "the central axis of the joined honeycomb segment assembly", to As to the obtained honeycomb structure, evaluation of "a contour accuracy of a surface" was performed by the above method. The results are shown in Table 1.

As seen from Table 1, in Examples 1 to 4, the obtained honeycomb structures had a suitable "contour accuracy of the surface", and obtained suitable grinding results. Moreover, in Example 1, a result of "a long life" was obtained in "a grinding wheel life test".

Figure 9:
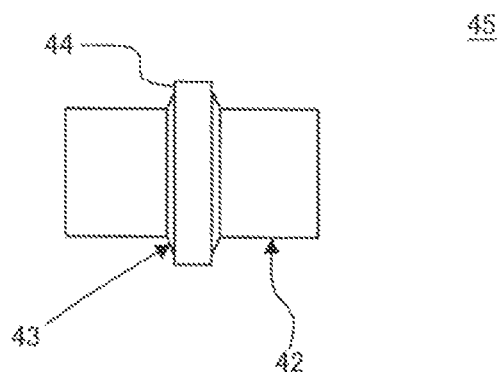
FIG. 9 is a side view schematically showing a honeycomb structure prepared in Example 6.

Moreover, as seen from Table 1, in Example 5, the grinding wheel width Wa was short. Therefore, "the contour accuracy of the surface" of the obtained honeycomb structure slightly deteriorated, and a small "spiral" non-ground portion was left on a ground surface. In Example 6, a taper widths Wb was small, and hence a first grinding wheel tapered surface and a second grinding wheel tapered surface were slightly small. Consequently, as shown in FIG. 9, a small stepped non-ground portion 44 was left in a portion of an obtained honeycomb structure 45 which had to be provided with a tapered surface. The stepped non-ground portion 44 was not tapered, and had a shape having a surface parallel to an end surface of the honeycomb structure 45. Moreover, "the contour accuracy" of the ground surface of the honeycomb structure slightly deteriorated. Here, FIG. 9 is a side surface schematically showing the honeycomb structure 45 prepared in Example 6.

Furthermore, as seen from Table 1, in Example 7, a taper width Wb was large, and an outer periphery width Wc was small. Therefore, "a contour accuracy of a surface" of the obtained honeycomb structure slightly deteriorated, and a small "spiral" non-ground portion was left on the ground surface. In Example 8, a grinding wheel end surface diameter direction length d was slightly long. Therefore, a rigidity of a grind processing member slightly deteriorated, stable grinding was not easily performed, and "the contour accuracy of the surface" of the obtained honeycomb structure slightly deteriorated. In Example 9, a grinding wheel width Wa was slightly large. Therefore, a mass of a grind processing member was slightly large, vibration during rotation of the grind processing member slightly increased, and "the contour accuracy of the surface" of the obtained honeycomb structure slightly deteriorated.

Additionally, as seen from Table 1, in Comparative Example 1, the first tapered surface and the second tapered surface were formed while obliquely moving the grind processing member. Therefore, a movement speed of the grind processing member was low, and "a total time" lengthened. Moreover, "surface contour accuracy" of the first tapered surface and the second tapered surface of the obtained honeycomb structure also deteriorated.

A grinding method of a honeycomb structure of the present invention can be utilized in manufacturing a ceramic honeycomb structure.

DESCRIPTION OF REFERENCE SIGNS

1: grind processing member, 2: disc portion, 3: grinding wheel portion, 4: outer peripheral surface, 5: first grinding wheel tapered surface, 6: second grinding wheel tapered surface, 7: one end surface of the grinding wheel portion, 8: the other end surface of the grinding wheel portion, 11: joined honeycomb segment assembly, 12: ceramic honeycomb segment, 13: side surface, 14: first end, 15: second end, 16: joining portion, 21: first ground region, 22: first tapered portion, 23: second ground region, 24: second tapered portion, 25: non-ground region, 26: remaining non-ground region, 31: first tapered surface, 32: second tapered surface, 33: center ground surface, 41 and 45: honeycomb structure, 42: honeycomb base material, 43: ring-like bulge portion, 44: stepped non-ground portion, 51: rotating member, Wa: grinding wheel width, Wb: taper width, Wc: outer periphery width, d: grinding wheel end surface diameter direction length, a: central axis direction, b: central axis direction, A, B, C, D, E and F: grinding state.

What is claimed is:
1. A grinding method of a honeycomb structure which subjects an outer peripheral portion of a joined honeycomb segment assembly to grind processing by use of a disc-like grind processing member,
the grind processing member including a disc-like disc portion and a ring-like grinding wheel portion disposed on an outer periphery of the disc portion,
wherein in a state where a central axis of the grind processing member is parallel to a central axis of the joined honeycomb segment assembly, the outer peripheral portion of the joined honeycomb segment assembly is ground by the grinding wheel portion of the grind processing member, while rotating the joined honeycomb segment assembly around the central axis and rotating the grind processing member around the central axis, to prepare the honeycomb structure including a columnar honeycomb base material and a ring-like bulge portion,
the grinding wheel portion of the grind processing member has an outer peripheral surface formed in parallel with the central axis, a first grinding wheel tapered surface formed at one end in a central axis direction in such a tapered manner as to decrease an outer diameter of a tip, and a second grinding wheel tapered surface formed at the other end in the central axis direction in such a tapered manner as to decrease the outer diameter of the tip, and
the joined honeycomb segment assembly is an assembly to be ground which is formed by joining side surfaces of a plurality of ceramic honeycomb segments to one another,
the grinding method of the honeycomb structure having:
a first ground region forming step where the grinding wheel portion of the grind processing member grinds a part of the outer peripheral portion of the joined honeycomb segment assembly having a first end as one end and a second end as the other end, on the side of the first end, to form a first ground region of the honeycomb base material and a first tapered portion of the ring-like bulge portion;
a second ground region forming step where the grinding wheel portion of the grind processing member grinds a part of a non-ground region of the outer peripheral portion of the joined honeycomb segment assembly as a region which is not ground, on the side of the second end, to form a second ground region of the honeycomb base material and a second tapered portion of the ring-like bulge portion; and
a center ground surface forming step, which is performed after the first and second ground region forming steps are completed, where the grinding wheel portion of the grind processing member grinds a remaining non-ground region of the outer peripheral portion of the joined honeycomb segment assembly as a region which is left non-ground, to form a center ground surface of the ring-like bulge portion,
wherein in the first ground region forming step, the grind processing member is set to a grinding position for the first ground region before contacting the joined honeycomb segment assembly, then the first ground region is formed by grinding of the grind processing member moving only in parallel to the central axis of the joined honeycomb segment assembly from the first end toward the second end of the joined honeycomb segment assembly such that the outer peripheral surface of the grinding wheel portion forms the first ground region, and the first grinding wheel tapered surface of the grinding wheel portion forms the first tapered portion which tapers toward the first end, between the non-ground region which is not ground on the second end side and the first ground region,
in the second ground region forming step, the grind processing member is set to a grinding position for the second ground region before contacting the joined honeycomb segment assembly, then the second ground region is formed by grinding of the grind processing member moving only in parallel to the central axis of the joined honeycomb segment assembly from the second end toward the first end of the joined honeycomb segment assembly such that the outer peripheral surface of the grinding wheel portion forms the second ground region, and the second grinding wheel tapered surface of the grinding wheel portion forms the second tapered portion which tapers toward the second end, between the remaining non-ground region which is not ground left non-ground and the second ground region, and then
in the center ground surface forming step, the grind processing member is set to a grinding position for the center ground surface before contacting the joined honeycomb segment assembly, then the center ground surface is formed by grinding of the grind processing member moving only in parallel to the central axis of the joined honeycomb segment assembly from one of the first end and the second end toward the other of the first end and the second end of the joined honeycomb segment assembly such that the center ground surface formed in the center ground surface forming step is the surface which comes in contact with a first tapered surface which is the tapered surface of the first tapered portion and a second tapered surface which is the tapered surface of the second tapered portion, the honeycomb base material of the honeycomb structure is formed by joining the side surfaces of the plurality of ceramic honeycomb segments to one another, and the ring-like bulge portion of the honeycomb structure surrounds an outer periphery of the honeycomb base material, protrudes from the outer periphery of the honeycomb base material toward the outside in a flange manner, and has the first tapered surface, the second tapered surface and the center ground surface.

2. The grinding method of the honeycomb structure according to claim 1, wherein a grinding wheel width which is a length of the grinding wheel portion in the central axis direction is from 25 to 35 mm.

3. The grinding method of the honeycomb structure according to claim 1, wherein an outer periphery width which is a length of the outer peripheral surface of the grinding wheel portion in the central axis direction is from 9 to 15 mm.

4. The grinding method of the honeycomb structure according to claim 2, wherein an outer periphery width which is a length of the outer peripheral surface of the grinding wheel portion in the central axis direction is from 9 to 15 mm.

5. The grinding method of the honeycomb structure according to claim 1, wherein a length of each of one end surface and the other end surface of the grinding wheel portion in the central axis direction, in a diameter direction which is a direction from the central axis toward the outside is from 3 to 7 mm.

6. The grinding method of the honeycomb structure according to claim 2, wherein a length of each of one end surface and the other end surface of the grinding wheel portion in the central axis direction, in a diameter direction which is a direction from the central axis toward the outside is from 3 to 7 mm.

7. The grinding method of the honeycomb structure according to claim 3, wherein a length of each of one end surface and the other end surface of the grinding wheel portion in the central axis direction, in a diameter direction which is a direction from the central axis toward the outside is from 3 to 7 mm.

8. The grinding method of the honeycomb structure according to claim 4, wherein a length of each of one end surface and the other end surface of the grinding wheel portion in the central axis direction, in a diameter direction which is a direction from the central axis toward the outside is from 3 to 7 mm.

9. The grinding method of the honeycomb structure according to claim 8, wherein a contour accuracy of a side surface of the honeycomb structure is less than 0.3 mm.

* * * * *